United States Patent [19]
Sherrod

[11] Patent Number: 5,426,285
[45] Date of Patent: Jun. 20, 1995

[54] MODULAR CARD READ/WRITE APPARATUS

[76] Inventor: Ray Sherrod, 10231 Bach Blvd., St. Louis, Mo. 63132

[21] Appl. No.: 986,470

[22] Filed: Dec. 7, 1992

[51] Int. Cl.$^6$ .............................................. G06K 7/08
[52] U.S. Cl. ..................................... 235/449; 235/493
[58] Field of Search ....................... 235/379, 449, 493; 360/2

[56] References Cited

U.S. PATENT DOCUMENTS

| | | | |
|---|---|---|---|
| 3,849,631 | 11/1974 | Merlino | 235/484 |
| 3,988,571 | 10/1976 | Blair et al. | 235/379 |
| 4,562,490 | 12/1985 | Barth et al. | 360/44 |
| 4,599,510 | 7/1986 | Barth et al. | 235/449 |
| 4,711,993 | 12/1987 | Kosednar et al. | 235/380 |
| 4,907,257 | 3/1990 | Asano | 235/380 |
| 5,008,552 | 4/1991 | Kuramochi | 235/484 |

Primary Examiner—Harold Pitts
Attorney, Agent, or Firm—Heller & Kepler

[57] ABSTRACT

A modular magnetic card read/write apparatus for installation in an associated mechanism is constructed from modular read/write assemblies. The module construction allows for assembly of different length card read/writers by adding additional modules to fit longer or shorter card paths imposed by the particular application and the associated mechanism. Modular read/write assemblies further provide the option of multiple head readers at various positions to allow reading of more than one card track without modification to the apparatus.

16 Claims, 7 Drawing Sheets

MODULAR CARD READ/WRITE APPARATUS

BACKGROUND OF THE INVENTION

1. Field of the Invention

The present invention relates generally to modular magnetic card readers/writers, to be installed in associated mechanisms, and pertains, more particularly to a modular reader/writer assembly. The modular assembly is capable of reading cards of various sizes and configurations without modifications, and readily adapts to various path length constraints of associated mechanisms.

2. Description of the Prior Art

Magnetic card read/write assemblies are traditionally configured to accept one size card only. Applications requiring acceptance of multiple card sizes would require multiple readers. Further, cards having magnetic data encoded on different tracks are generally not processed by a single read/write assembly. Finally, applications requiring a specific card path length in order to allow ejection of the card into the associated mechanism require custom design and construction of a read/write assembly.

An object of this invention is to provide a magnetic card read/write apparatus in which magnetic cards of different sizes can be read or written on without modification of the apparatus.

It is a further object of this invention to provide a magnetic card read/write apparatus capable of reading magnetic data encoded on different card tracks without modification of the apparatus.

It is a further object of this invention to provide a modular read/write assembly to provide customized path lengths with the use of basic components.

SUMMARY OF THE INVENTION

To accomplish the foregoing and other objects of this invention there is provided a modular read/write apparatus.

Modular read/write assemblies are interlocked linearly by snap-lock projections to form the desired card path length, avoiding costly custom design. The card path length is the distance necessary to allow the apparatus to eject the card directly into the associated mechanism if desired. In addition, multiple read/write assemblies may also be constructed for the purpose of use of the multiple magnetic heads. Each head would be positioned to read data located along a particular track of the card, allowing one apparatus to read cards with magnetic data encoded at different locations on the card.

The module assembly includes a spring device to properly align a card for reading regardless of its size. This allows the use of various card sizes, typically CR-50 and CR-80 without modification of the apparatus.

DETAILED DESCRIPTION

Referring now to the drawings, there is shown a preferred embodiment for the read/write apparatus.

Figure 1:
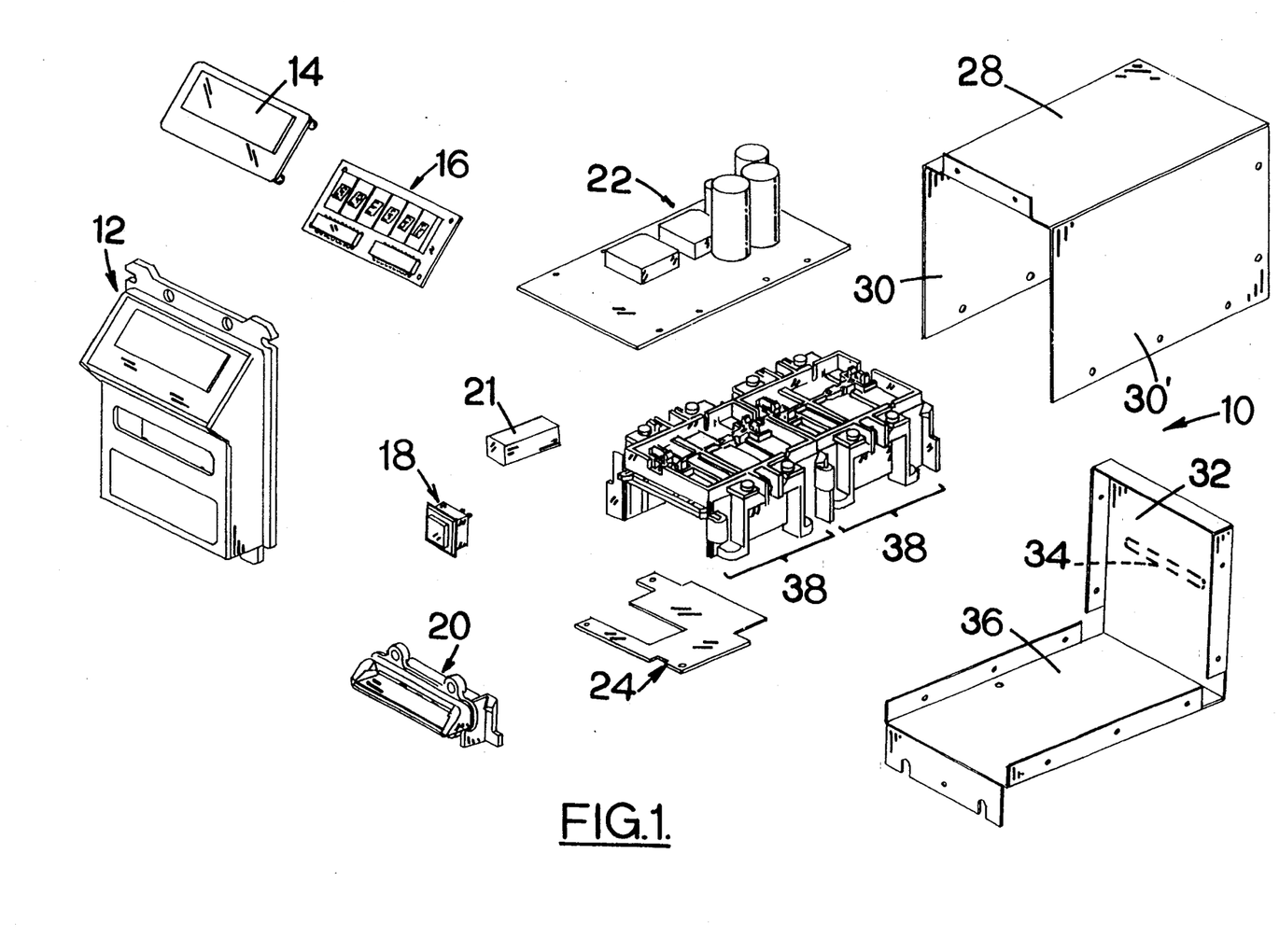
FIG. 1 is an exploded view of the read/write apparatus having a two read/write module construction.

The magnetic card read/write apparatus 10, shown in FIG. 1 is encased by enclosure 26 assembled from top 28, back 32, base 36 and side 30, 30' sections. Back section 32 includes a slot 34 for ejection of the card. The front adaptor 12 houses an LCD display 16 under lens 14. The display is illuminated by switch 18 which provides momentary backlight. Adaptor 12 further supports nose section 20 through which a magnetic card can be introduced into the apparatus 10. A control circuitry board 22 is located above the reader module 38, which is described in detail below. The read/write circuity 24 is located below the reader module 38. A standard bar code reader 21 is located at the card receiving end of the read/write module 38. The electronic circuitry utilized by the apparatus being conventional and well-known in the art it will not be discussed in detail.

Figure 2:
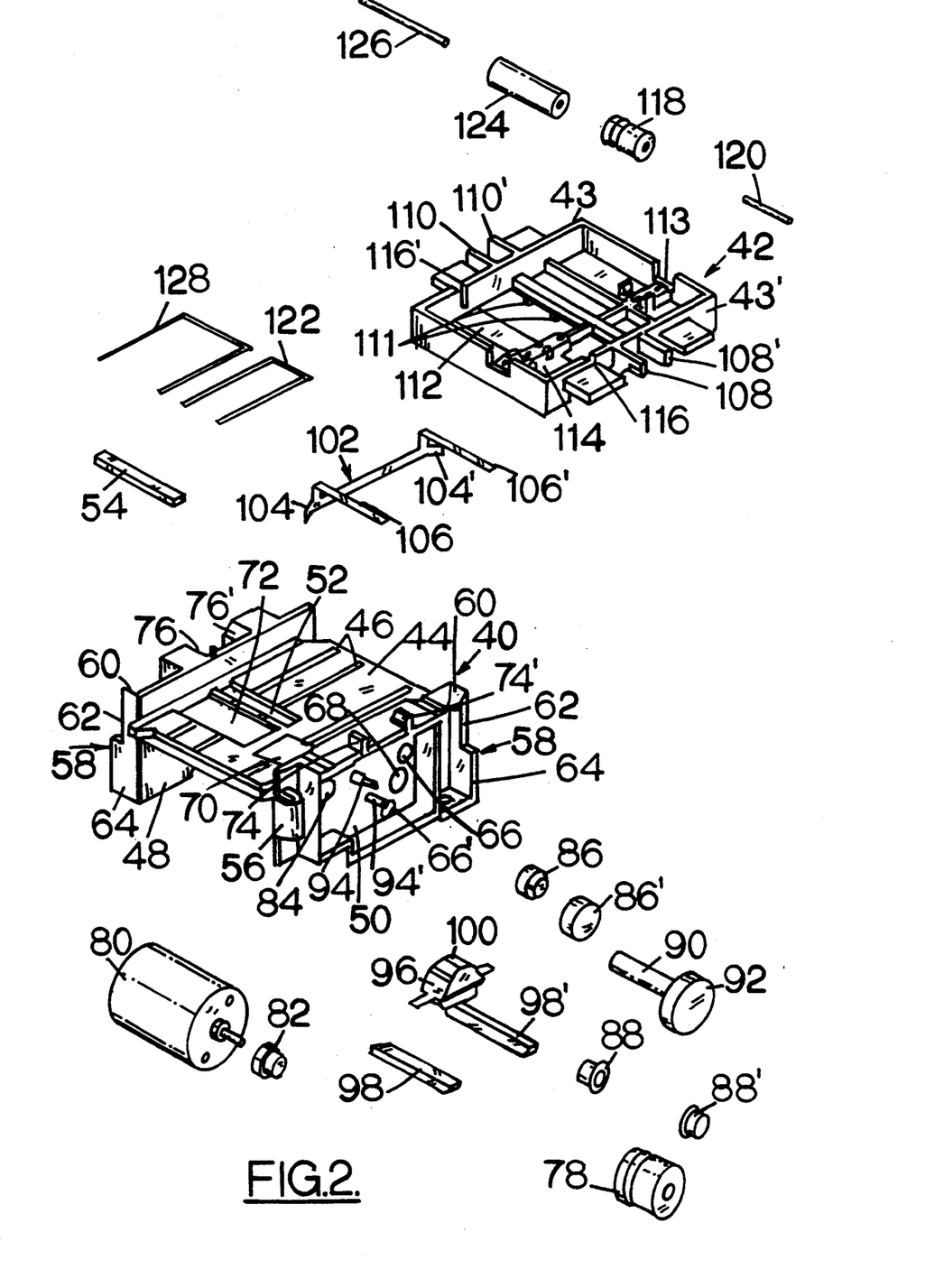
FIG. 2 is an exploded view of a single read/write module.

The reader module 38 shown in FIG. 2 is constructed from a molded bottom assembly 40 and a molded top assembly 42.

Figure 3:
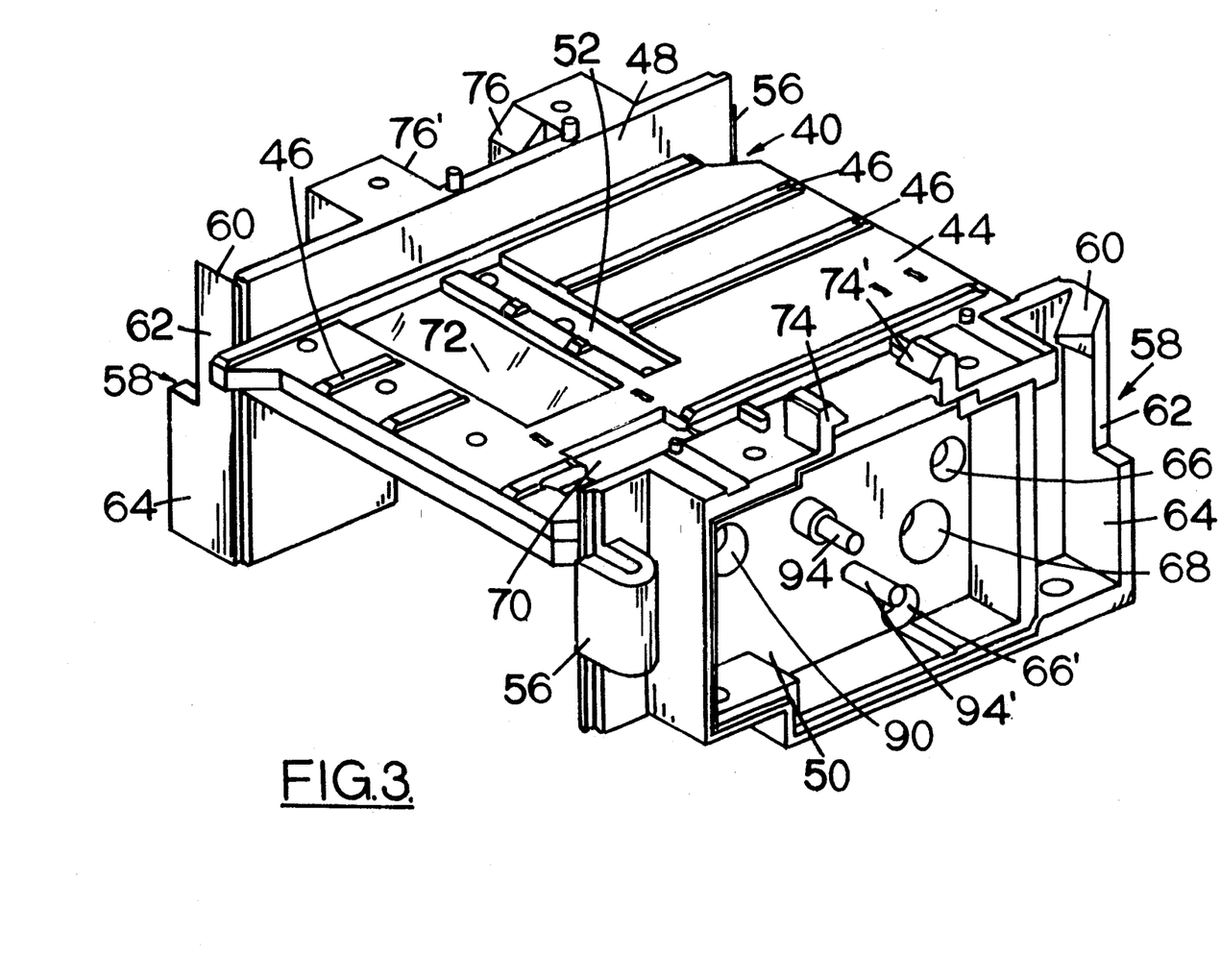
FIG. 3 is a perspective view of the molded module bottom assembly.

The bottom assembly 40 shown in FIG. 3 includes a base portion 44 and side support portions 48, 50. The base portion 40 includes integral raised card track portions 46 to minimize friction and a depression 52 housing a felt dust collector 54.

Each side portion 48, 50 includes a u-shaped projection 56 extending outwardly from the side 48,50 at one corner, and a u accepting projection 58, including tapered portion 60, indentation 62, and bottom 64 portion, extending outward from the opposite corner to provide for modular interlock. Side 50 includes tapered inverted L-shaped projections 74, 74' extending upwardly from bottom assembly 40. Side 48 includes two rectangular projections extending outwardly from bottom assembly 40 having tapered upper inner corners.

As seen in FIG. 2 aperture 70 provides access to the card for a driven roller 78. Drive roller 78 is mounted between drive bearings 88, 88' on drive shaft 90 which is supported by bottom assembly side 50 through aperture 84. Drive gear 92, located on the exterior of side 50 turns the drive shaft 90 and roller 78 in response to turning of gears 86, 86' on gear axles 94, 94' initiated by the movement of motor gear 82 by motor 80. Motor 80 is supported by side 50 through aperture 68 and is mounted to side 50 through apertures 66, 66'. Aperture 72 accommodates the magnetic head 100, which is supported by head holder 96 and holder retainers 98, 98' mounted on bottom assembly base 44. Spring 102 having leading edge portion 104 is supported on bottom assembly 44 by supports 106, 106'.

Figure 4:
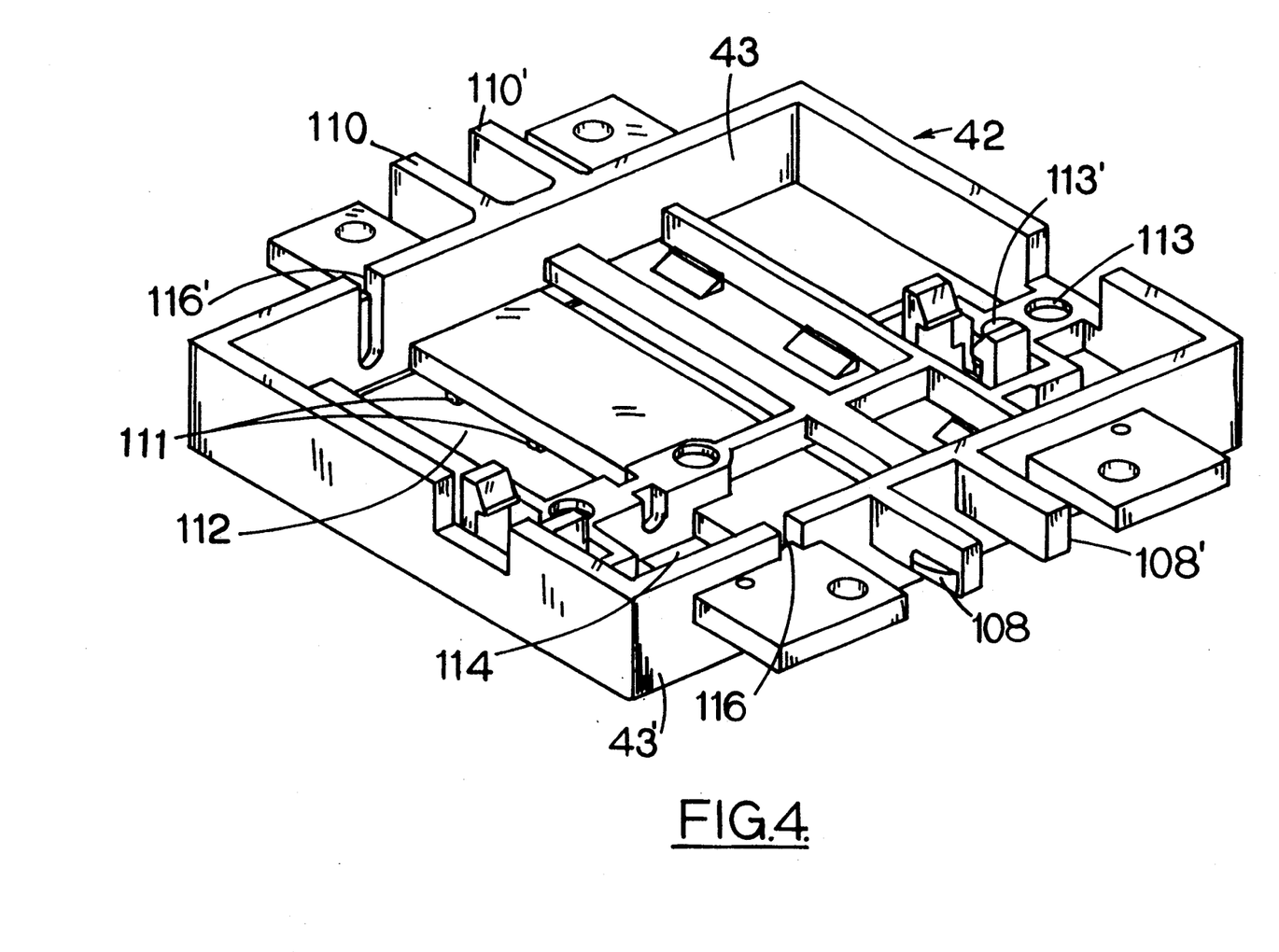
FIG. 4 is a perspective view of the molded module top assembly.
Figure 5:
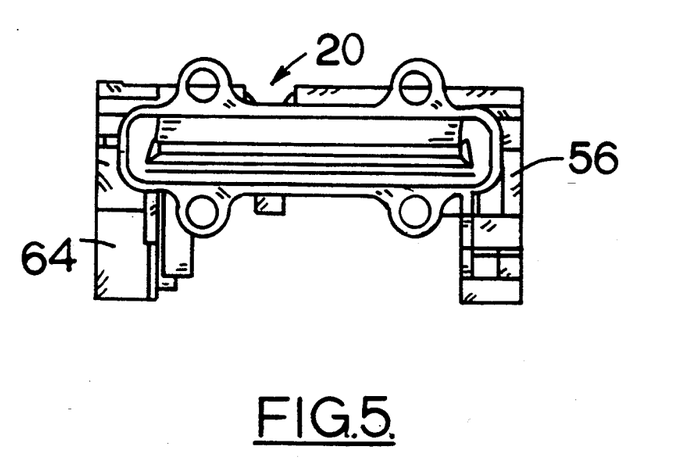
FIG. 5 is a front view of two assembled read/write modules.
Figure 6:
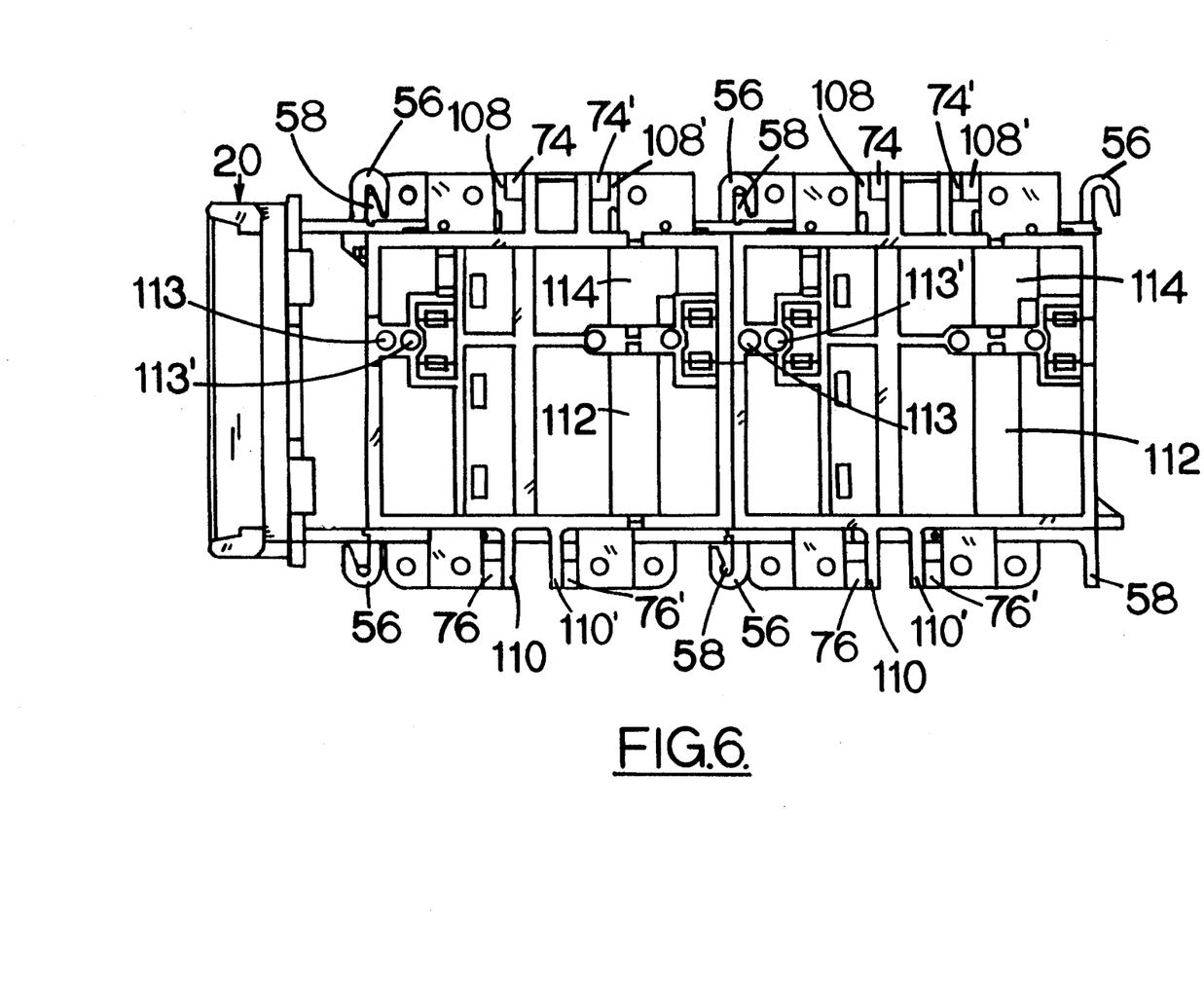
FIG. 6 is a top view of two assembled read/write modules.
Figure 7:
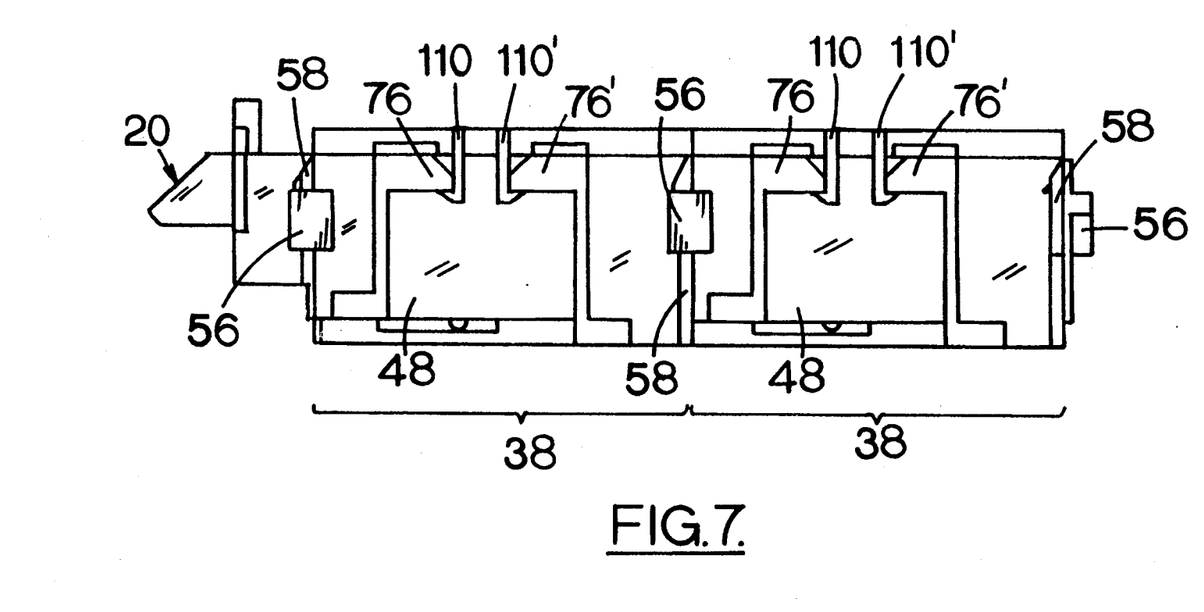
FIG. 7 is a side view of two assembled read/write modules.

The top assembly 42 shown in FIG. 4 includes integral raised card track portions 111 to minimize friction, two elongated tapered hook projections 110, 110' at side 43 and extending downwardly from assembly 42, and two tapered hook projections, 108, 108' at side 43' extending outwardly from top assembly 42. Sensor slots 113, 113' provide access for use of a convention electronic sensing device to detect the presence of a card in the read/write module 38. As seen in FIG. 2, aperture 112 provides the roller idler 124 access to the card, and aperture 114 provides access to the anvil idler roller 120. The roller idler 124 and the anvil idler roller 118 move about axles 126 and 120 respectively, both axles being supported on assembly 42 by depressed notches 116, 116', and are held in place by idler spring 128 and idler anvil spring 122 respectively.

When assembled, top assembly 42 and bottom assembly 40 are aligned so that bottom assembly side 40 is in contact with top side 43. The assemblies are snapped into place so that bottom projections 74, 74' are hooked together with top projections 108, 108', and top projections 110, 110' are hooked under bottom projections 76, 76'. When assembled, a card path is provided between the top and bottom assemblies.

To increase the path length of the card, two or more reader modules can be linearly assembled. Two modules are connected by holding the modules at a slight angle to each other so that each u-shaped projection 56 is resting above and against the tapered portion 60 of the u-accepting projection 58. The modules are then twisted into the same plane so that the u-shaped projections 56 expand over the tapered portions 60 of the acceptor projections 58 and lock into place against the indented portion 62 of the acceptor 58.

1. Operation of a One Module Assembly

The card to be read is introduced through the nose section 20. The leading edge 104 of card spring 102 urges the card into alignment by applying pressure against one edge of the card so that the opposite edge of the card is directed against one side of the read/write module 38. This allows various card sizes, typically CR-80 and CR-50 to be used without additional modifications by insuring that each card is moving along the same track. Once the card reaches the driven roller 78 the movement of the card is controlled by the read/write module 38. Roller 78 moves the card into position for the magnetic head 100 to read the data encoded on the card. The data is then transferred to the associated mechanism by the control circuitry 22. Upon receipt of directions from the associated mechanism, the control circuitry 22 may direct the magnetic head 100 to write on the card, after which motor 80 may be instructed to cause the roller 78 to either move the card in a forward direction thereby ejecting the card into the associated mechanism through slot 34 or reversing roller 78 direction and ejecting the card through the nose 20, returning the card to the user.

2. Operation of Two or More Modules

The card is introduced through nose section 20, aligned by spring 102 and moved into position for reading by magnetic head 100 as described for the operation of a one module assembly. After data transfer by control circuitry 22 several options exist. If data transfer is complete, the card can be ejected through the nose section 20 or ejected through the remaining module into the associated mechanism through slot 34. If the data read by the first module is insufficient, roller 78 can move the card into the second module for reading by a second magnetic head 100', typically located at a different position than magnetic head 100. At the completion of data transfer, the card can be ejected through the nose section 20 by travelling through the first module, or can be ejected directly into the associated mechanism by the second module 38' through slot 34.

The number of modules to be connected is determined by one or both of the following conditions. The path length can be determined so as to allow the card to be ejected into the associated mechanism. The number of modules having read/write capabilities can be determined by the number of different configurations of magnetic cards necessary for the apparatus to be able to read or write on for the particular application.

From the foregoing description, those skilled in the art will appreciate that all the objects of the present invention are realized. A modular card read/write apparatus capable of accepting cards of different sizes without modification to the apparatus is provided. Further, the modular assembly provides a read/write apparatus capable of reading or writing on cards having magnetic data encoded on different card tracks, as well as provided customized card path length.

While a specific embodiment has been shown and described, many variations are possible. The read/write head and the dimensions of the modular components may be changed to allow use of a different read/write mechanism, including bar code, smart card and optical card read/write systems.

Having described the invention in detail, those skilled in the art will appreciate that modifications may be made of the invention without departing from its spirit. Therefore, it is not intended that the scope of the invention be limited to the specific embodiment illustrated and described. Rather, it is intended that the scope of this invention be determined by the appended claims and their equivalents.

What is claimed is:

1. A magnetic card read/write apparatus for installation in an associated mechanism comprising:
    at least one read/write module, the module including;
        reversible drive means for moving the card into the module and expelling the card from the module,
        means to align the card against one side of the module thereby allowing the module to accept cards of various sizes,
        magnetic read/write means, the read/write means being adjustable positionable to correspond to a particular magnetic card configuration,
        an interlocking assembly mechanism to allow assembly of the module in linear alignment with a subsequent module, thereby providing for custom sizing of the length of the card path through the apparatus, and further providing for the use of multiple read/write means along the card path, said read/write apparatus further including,
    means to transfer data to such associated mechanism.

2. The apparatus defined in claim 1 wherein the apparatus further includes means to align and receive the card into the apparatus.

3. The apparatus defined in claim 1 wherein the apparatus further includes a user interface means.

4. The apparatus as defined in claim 1 wherein the read/write module further includes a bar code reader.

5. The apparatus defined in claim 1 wherein the reversible drive means is a motor driven roller mechanism.

6. The apparatus defined in claim 1 wherein the card alignment means is a spring loaded mechanism.

7. The apparatus defined in claim 1 wherein the read/write means is an adjustable positioned magnetic head.

8. The apparatus defined in claim 1 wherein the assembly mechanism is a snap lock configuration.

9. A self-contained magnetic card read/write apparatus for installation in an associated mechanism comprising:
- at least one read/write module, the module including;
  - a molded bottom assembly having a base portion including an integral raised track portion, a depression containing a felt dust collector, and side support portions extending substantially below the base portion,
  - a molded top assembly having an integral raised track portion, the top and bottom assemblies so constructed to provide a card path between the assemblies when mounted together,
  - a reversible motor driven roller mechanism including a driven roller extending through an aperture in the bottom assembly to contact one side of the card, and an idler roller extending through an aperture in the top assembly to contact the opposite side of the card, the roller mechanism being capable of moving the card into the module for reading and thereafter expelling the card, the motor and motor driven roller being supported by the bottom assembly side support portions,
  - a spring mechanism to apply pressure along one edge of the card thereby aligning the opposite edge of the card against one side of the module,
  - a magnetic read/write head positioned below an aperture in the bottom assembly to read magnetic data encoded on the card,
  - a snap lock assembly mechanism thereby allowing linear alignment of the module with a subsequent module, thereby providing for custom sizing of the length of the card path through the apparatus, and further providing for the use of multiple magnetic read/write heads along the card path, and the read/write apparatus further including control circuitry to analyze and transfer data to the associated mechanism.

10. The apparatus defined in claim 9 wherein said apparatus further includes a nose portion to align and receive the card into the apparatus.

11. The apparatus defined in claim 9 wherein said apparatus further includes a LCD user interface.

12. The apparatus defined in claim 9 wherein the read/write module further includes:
- a bar code reader,
- a u-shaped projection, and
- a u-shaped acceptor projection having a tapered upper end, an indented middle section, and a lower section, the indented section forming shoulders with the tapered upper end and lower section, whereby the u-shaped projection is forced along and past the tapered end to lock along the indented section between the shoulders of the u-shaped acceptor projection.

13. The apparatus defined in claim 12 wherein the snap lock assembly mechanism comprises a means for constructing a card path of a length necessary for a particular application using at least two (2) read/write modules comprising:
- determining the number of modules necessary to attain the desired card path length;
- aligning two modules end to end;
- interlocking the modules by
  a) holding the modules at a slight angle to each other so that each U-shaped projection is resting above and against the tapered portions of the u-shaped acceptor projection, and
  b) twisting the modules into the same plane so that the u-shaped projections expand over the tapered portions of the u-shaped acceptor projection and lock in place against the indented portion of the u-shaped acceptor projection, and repeating the alignment and interlocking steps until the desired number of modules are connected.

14. A method for reading/writing data encoded on a magnetic card for use with a read/write assembly installed in an associated mechanism comprising: introducing the card to be read into a card path through a receiving end of the read/write assembly, engaging a reversible drive of a first read/write module, driving the card into position to be read by the first read/write module, determining whether data encoded on card can be read by the first read/write module, if data can be read by the first module, then reading data located at a specific position on the card, transferring the data to the associated mechanism, writing necessary data on the card, and ejecting the card from the read write assembly, if data cannot be read by the first module, then driving the card out of the first module, engaging the reversible drive means of a second read/write module, driving the card into position to be read by the second read/write module, and repeating the determining and subsequent steps until the card is ejected by the apparatus.

15. The method defined in claim 14 wherein the card is ejected through the receiving end of the assembly.

16. The method defined in claim 14 wherein the card is ejected from the read/write assembly into the associated mechanism.

* * * * *